United States Patent
Bangole et al.

(10) Patent No.: US 9,384,081 B2
(45) Date of Patent: Jul. 5, 2016

(54) DELAYED DISK RECOVERY

(71) Applicant: GOGO LLC, Itasca, IL (US)

(72) Inventors: Premkumar Bangole, Bloomingdale, IL (US); Steven Sobieszek, Addison, IL (US); Anil Achut Rajasekharan, Schaumburg, IL (US)

(73) Assignee: GOGO LLC, Chicago, IL (US)

( * ) Notice: Subject to any disclaimer, the term of this patent is extended or adjusted under 35 U.S.C. 154(b) by 197 days.

(21) Appl. No.: 14/320,966

(22) Filed: Jul. 1, 2014

(65) Prior Publication Data

US 2016/0004586 A1 Jan. 7, 2016

(51) Int. Cl.
| | | |
|---|---|---|
| *G06F 11/00* | (2006.01) | |
| *G06F 11/07* | (2006.01) | |
| *G06F 11/30* | (2006.01) | |

(52) U.S. Cl.
CPC .......... *G06F 11/0793* (2013.01); *G06F 11/076* (2013.01); *G06F 11/0721* (2013.01); *G06F 11/0739* (2013.01); *G06F 11/3013* (2013.01)

(58) Field of Classification Search
CPC ............ G06F 11/0721; G06F 11/0739; G06F 11/076; G06F 11/0793; G06F 11/3013
See application file for complete search history.

(56) References Cited

U.S. PATENT DOCUMENTS

| | | | |
|---|---|---|---|
| 2004/0255186 A1* | 12/2004 | Lau .......................... | G06F 11/20 714/6.12 |
| 2005/0229020 A1* | 10/2005 | Goodman ............ | G06F 11/0727 714/2 |
| 2006/0156194 A1* | 7/2006 | Mischo ............... | G06F 11/0793 714/763 |
| 2007/0198874 A1* | 8/2007 | Watanabe ........... | G06F 11/0739 714/49 |
| 2009/0037780 A1* | 2/2009 | Nakagaki ............ | G06F 11/0739 714/48 |
| 2009/0076681 A1* | 3/2009 | Yasue ................. | G06F 11/1446 701/33.4 |
| 2009/0132117 A1* | 5/2009 | Kondoh ................ | G06F 11/167 701/36 |
| 2012/0054570 A1* | 3/2012 | Lillestolen ............ | G06F 11/073 714/746 |
| 2015/0317198 A1* | 11/2015 | Kume ..................... | G06F 12/16 714/6.11 |

* cited by examiner

*Primary Examiner* — Joshua P Lottich
(74) *Attorney, Agent, or Firm* — Marshall, Gerstein & Borun LLP; Randall G. Rueth (57) ABSTRACT

A method of recovering content stored on a computer readable medium transported by a vehicle comprises identifying, by one or more computer processors, an error on the computer readable medium, storing, by the one or more computer processors, an indication of the error, and detecting, by the one or more computer processors, an interval of travel of the vehicle during which the computer readable medium has access to stable power. The method further includes, during the detected interval of travel, initiating, by the one or more computer processors, a recovery of the computer readable medium based on the indication of the error.

20 Claims, 5 Drawing Sheets

DELAYED DISK RECOVERY

CROSS-REFERENCE TO RELATED APPLICATIONS

The present application is related to U.S. patent application Ser. No. 14/320,970 entitled "CONTENT INTEGRITY CHECKS" and filed concurrently herewith, the contents of which are hereby incorporated by reference in their entirety.

FIELD AND BACKGROUND OF THE DISCLOSURE

1. Technical Field

The instant disclosure generally relates to data recovery and, in particular, to methods for recovering content stored on devices on-board vehicles, such as aircraft.

2. Background

Hard disk drives or solid state drives on-board vehicles, such as aircraft, are often housed in a harsh environment. For example, an aircraft can lose power momentarily when pushing back from a gate or when arriving at a gate because of a switch between ground power (e.g., provided by a ground power unit) and aircraft power (e.g., provided by power sources on the aircraft). This switching of power sources or loss of power can damage drives on-board the aircraft resulting in a loss of data, such as a loss of content (movies, music, etc.) to be distributed to passengers on the aircraft.

Most disk drives go through read and write cycles, and a loss of power to a disk, especially during a write cycle can corrupt the disk. Power on-board vehicles is not predictable, and, thus, corruption or damage to disks is likely. Operating systems and disk utilities can try to "recover" a damaged disk (e.g., via repairing partition tables or recovering portions of damaged files). However, many disk recovery processes are lossy and can cause further damage to a disk if the disk losses power during the recovery. In fact, such a loss of power during recovery can render the disk totally unusable.

BRIEF SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, a method of recovering content stored on a computer readable medium transported by a vehicle comprises identifying, by one or more computer processors, an error on the computer readable medium, storing, by the one or more computer processors, an indication of the error, and detecting, by the one or more computer processors, an interval of travel of the vehicle during which the computer readable medium has access to stable power. The method further includes, during the detected interval of travel, initiating, by the one or more computer processors, a recovery of the computer readable medium based on the indication of the error.

In another embodiment, a computer device for recovering a content storage device being transported by a vehicle comprises one or more processors and one or more non-transitory memories coupled to the one or more processors. The one or more non-transitory memories include computer executable instructions stored therein that, when executed by the one or more processors, cause the computer device to execute a script to mount the content storage device for accessing content stored by the content storage device, detect a failure of the script to mount the content storage device, and store an indication of the failure to mount the content storage device. The instructions further cause the computer device to detect an interval of travel of the vehicle during which the content storage device is powered by a stable source of power, and, during the detected interval of travel, initiate a recovery of the content storage device based on the indication of the failure to mount the content storage device.

In yet another embodiment, a system disposed in a vehicle for recovering content to be distributed to passengers on-board the vehicle comprises a plurality storage devices storing the content to be distributed to passengers on-board the vehicle, one or more processors, and one or more non-transitory memories. The one or more non-transitory memories store computer executable instructions that, when executed by the one or more processors, cause the one or more processors to identify an error on at least one of the plurality of storage devices, record an indication of the error, detect an interval of travel of the vehicle during which the plurality of storage devices are powered by a stable power source, and, during the interval of travel, initiate a recovery of the computer readable medium based on the recorded indication of the error.

DETAILED DESCRIPTION OF THE PREFERRED EMBODIMENTS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Any or all of the contents of the present disclosure may operate in conjunction with any or all of the contents of the disclosures of co-pending U.S. patent application Ser. No. 13/675,200 entitled "VEHICLE DATA DISTRIBUTION SYSTEM AND METHOD," co-pending U.S. patent application Ser. No. 13/675,194 entitled "COMMUNICATIONS SYSTEM AND METHOD FOR NODES ASSOCIATED WITH A VEHICLE, and co-pending U.S. patent application Ser. No. 13/675,190 entitled "GROUND SYSTEM FOR VEHICLE DATA DISTRIBUTION," the contents of which are hereby incorporated by reference in their entireties.

Additionally, any or all of the contents of the present disclosure may operate in conjunction with any or all of the contents of the disclosures of co-pending U.S. patent application Ser. No. 14/225,077 entitled "OPTIMIZING USAGE OF MODEMS FOR DATA DELIVERY TO DEVICES ON VEHICLES," co-pending U.S. patent application Ser. No. 14/225,017 entitled "HYBRID COMMUNICATIONS FOR DEVICES ON VEHICLES," and co-pending U.S. patent application Ser. No. 14/225,050 entitled "DATA DELIVERY TO DEVICES ON VEHICLES USING MULTIPLE FORWARD LINKS," the contents of which are hereby incorporated by reference in their entireties.

On-Board System

Figure 1:
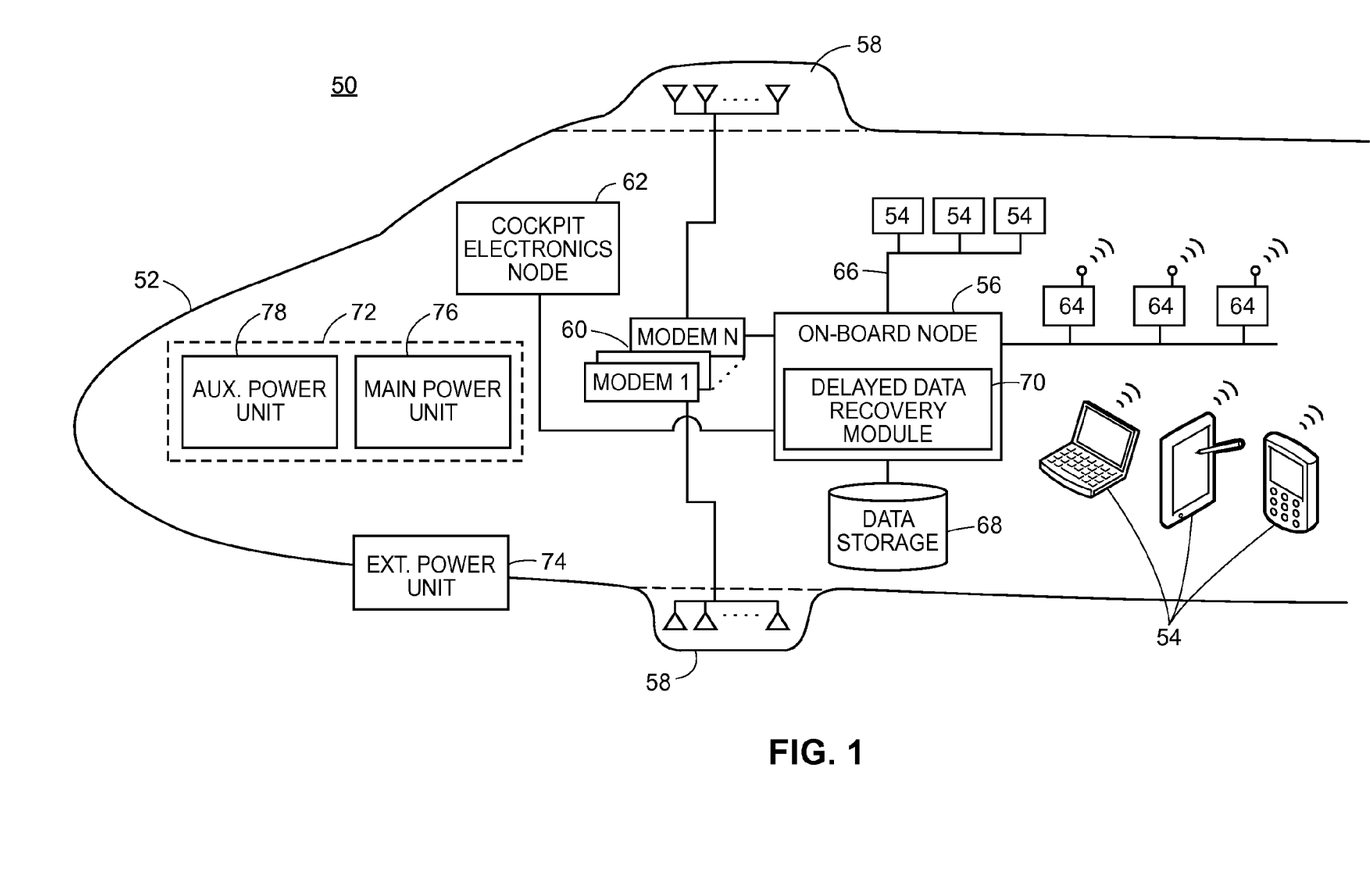
FIG. 1 is a block diagram of an example system on-board a vehicle that is configured to recover a data storage entity during time intervals in which the data storage entity has access to stable power.

FIG. 1 illustrates an example on-board system 50 in a vehicle 52, such as an aircraft, that may recover data or information stored on an on-board data storage entity 68 at times when the on-board data storage entity 68 is powered by a stable power source. In this manner, the on-board system 50 may recover the on-board data storage entity 68, such that it is useable by the on-board system 50, while preventing or minimizing further damage to the on-board data storage entity 68 caused by losses of power during recovery.

The on-board system may further receive information or data onto the vehicle 52 (e.g., information or data provided by a terrestrial data center or other suitable information distributor), store the information or data (e.g., on the on-board data storage entity 68), and cause information to be delivered from the vehicle 52, e.g., to a terrestrial data center or other remote computing device(s). Further details of a communications system, in which the vehicle 52 may operate so as to receive/communicate data, are discussed with reference to FIG. 2. The on-board system 50 may also cause data (e.g., stored on the on-board data storage entity 68) to be delivered to and/or received from one or more devices 54 being transported by the vehicle 52. The example on-board system 50 includes an on-board node 56, such as an ABS Central Processing Unit (ACPU), that may be a computing device communicatively connected to one or more external communication links via one or more antennas 58 and one or more modems or transceivers 60.

Each of the one or more antennas 58 may receive and transmit signals via a different respective frequency band allocated for wireless communications, e.g., the $K_a$ band, the L band, the $K_u$ band, the WiMAX band, the Wi-Fi band, a terrestrial cellular band, or any other suitable wireless communication frequency band. Each of the antennas 58 may be communicatively connected to an associated modem or transceiver 60 that is fixedly connected to the vehicle 52 and is configured to encode and decode information and data corresponding to signals at the respective antenna 58, in an implementation. The one or more modems or transceivers 60 may include a respective modem or transceiver that is compatible with TDMA (Time Division Multiple Access), GSM (Global System for Mobile Communications), CDMA (Code Division Multiple Access), LTE (Long Term Evolution) communications, WiMAX, and/or any other terrestrial mobile communications technology. In some embodiments, the one or more modems 60 may include a respective modem or transceiver that is compatible with EVDO (Evolution Data Optimized) or Wi-Fi communications technologies. It is clear, however, that the on-board system 50 may include any number of antennas 58 and any different number of associated modems or transceivers 60 to support any desired number of different wireless communication technologies.

In addition, when the vehicle 52 is an aircraft, a cockpit electronics node 62 may be communicatively coupled to the one or more modems 60. The cockpit electronics node 62 may be a LRU configured to collect electronic information from various instruments in the cockpit of the aircraft, e.g., during flight. In some cases, the cockpit electronics node 62 may provide collected flight information such as altitude, airspeed, aircraft position, or other flight state information to the on-board node 56 (which may subsequently store the information on the on-board data storage entity 68) or directly to a computing device disposed at a terrestrial location, e.g., via a designated return link.

At least some of the devices 54 may be mobile computing devices such as smartphones, tablet computers, laptop computers, personal digital assistants, e-readers, etc. that are capable of establishing a wireless communicative connection with the on-board node 56 via one or more wireless access points 64, e.g., via a wireless network interface. Some of the devices 54 may be wired computing devices that are communicatively connected to the on-board node 56 via a wired network 66.

In an embodiment, each of devices 54 may include an instance of a vehicle travel application (VTA) installed thereon and particularly configured to support services while the respective device 54 is being transported by the vehicle 52, e.g., when the vehicle 52 is traveling en route between ports. For example, the vehicle travel application may be configured to serve as the on-board end of a data tunnel that is established with the on-board node 56, the on-board data storage entity 68, or a terrestrial data center or other remote computing device(s) and/or networks. In an embodiment, the vehicle travel application may communicate with other applications installed on a particular one of the devices 54 (e.g., native terrestrial applications) so that the other applications may operate as desired (e.g., in a native manner) while the one of the devices 54 is being transported by the vehicle 52.

The on-board data storage entity 68 may store various types of data which may be distributed to and/or received from other devices 54 via the VTA, e.g., entertainment content (movies, music, etc.), web pages, account information, usage data, applications that may be installed, information identifying the devices 54, payment information (e.g., encrypted financial account information), digital rights management (DRM) keys, and/or any other data that is desired to be stored, at least temporarily, on-board the vehicle 52. The data storage entity 68 may include one or more non-transitory, tangible computer readable storage media. For example, the data storage entity 68 may include FLASH memory (e.g., "solid state" drives) or hard disk drives.

Various components of the system 50, such as the on-board data storage entity 68 and the on-board node 56, may be powered to operate by a combination of a number of on-board power sources 72 on the vehicle 52 and an external power input 74 to the vehicle. At a certain stage or interval of travel (e.g., on the ground, cruising altitude, etc. in the case of an aircraft), components of the system 50 may be powered by a different one of the on-board power sources 72 and the external power input 74 than at other intervals of travels. For example, when an aircraft is on the ground and shuts down one or more jet engines (i.e., a main power source), the aircraft may switch from a main power unit 76 to an auxiliary power unit 78 or to the external power input 74.

The main power unit 76 of the vehicle 52 may include various electrical components which generate and utilize electricity (alternating current, direct current, voltages, etc.) based on the operation of engines/motors that primarily provide propulsion (e.g., mechanical energy) to the vehicle 52. The electrical components may include generators, power control and conversion components (transformers, rectifiers, etc.), power distribution components (electrical leads, switches, buses, etc.), etc. For example, in the case of the vehicle 52 being an aircraft, the main power unit 76 may include a generator that converts a mechanical input from the jet or propeller engines of the aircraft (primarily providing propulsion for the aircraft) to current/voltage for the operation of a variety of on-board electronic components (e.g., the data storage entity 68).

The auxiliary power unit 78 may include various electrical components, such as generators, power control components, etc., that primarily provide current/voltage to components on-board the vehicle 52 for functionality other than propulsion. In an implementation, the auxiliary power unit 78 may be configured to provide power to the on-board node 56, the on-board data storage entity 68, etc. when one or more main propulsion engines/motors of the vehicle 52 are shut down. For example, the auxiliary power unit 78 of an aircraft may power the on-board node 56, the on-board data storage entity 68, etc. along with other components, such as air-conditioning equipment, hydraulic equipment, etc. before and after the jet engines of an aircraft are operating (e.g., at a gate of an airport).

The external power input 74 may also provide electricity to components on-board the vehicle 52 for functionality other than propulsion. However, in some implementations, the external power input 74 may receive a current/voltage signal from a power source external to the vehicle 52 that causes electrical components inside of the vehicle 52 to operate. For example, when an aircraft reaches a gate of an airport, the external power input 74 of the aircraft may be removably coupled to a ground power unit (GPU) or other external power source to power the on-board node 56, the on-board data storage entity 68, etc. when one or more main propulsion engines/motors of the aircraft are shut down.

Generally, a vehicle may include any type and number of suitable sources of power for various stages or intervals of travel. A vehicle may include any number of external power inputs, auxiliary power units, main power units, or other types of power units to power the on-board node 56, the on-board data storage entity 68, etc. along with other components, such as air-conditioning equipment, hydraulic equipment, etc. However, a vehicle may alternatively or additionally include other types of power units such as air turbines, solar panels, fuel cells, etc., and a vehicle may include various power/energy management components shared by more than one power unit or source, such as transformers, rectifiers, batteries, power management systems, etc. Although not shown in FIG. 1, the vehicle 52 may include any number and configuration of electrical leads or other power distribution components to transfer current/voltage from the on-board power sources 72 and the external power input 74 to components of the vehicle 52.

In some scenarios, such as when the vehicle 52 transitions from one travel interval (e.g., "parked") to another travel interval (e.g., "above service altitude"), the vehicle 52 may switch (e.g., mechanically and/or electrically) from one of the on-board power sources 72 and the external power input 74 to another of the on-board power sources 72 and the external power input 74. During such a transition, some of the components of the vehicle 52, such as the on-board data storage entity 68 may temporarily lose power. For example, when "pulling back" from an airport gate or when arriving or parking at an airport gate, an aircraft may switch from the main power source 76 to the external power input 74, and the on-board data storage entity 68 may be temporarily without power.

The on-board node 56 may include a delayed data recovery module 70 to recover data stored on the on-board data storage entity 68 when the on-board data storage entity 68 is damaged or corrupted by a temporary loss of power, such as in the scenario described above. In an embodiment, the delayed data recovery module 70 may comprise a set of computer executable instructions that are stored on a non-transitory, tangible computer-readable storage media (e.g., a memory) and are executable by one or more processors of the on-board node 56. In order to minimize further loss of data, the delayed data recovery module 70 may only initiate recoveries of the on-board data storage entity 68 at certain time intervals of travel during which the vehicle 52 employs a stable or predictable source of power. For example, the delayed data recovery module 70 may initiate recoveries of the on-board data storage entity 68 when the vehicle 52 is utilizing the main power unit 76, whereas the delayed data recovery module 70 may not initiate recoveries of the on-board data storage entity 68 when the vehicle 52 is utilizing the auxiliary power unit 76. In some instances, the delayed data recovery module 70 or other process may detect an error on the on-board data storage entity 68, but the delayed data recovery module 70 may delay or postpone data recovery until the on-board data storage entity 68 is powered by a stable power source. Further details of such a delayed recovery are discussed with reference to FIGS. 3 and 4.

The on-board node 56 may include one or more modules, applications, or processes (not shown) executed by one or more computer processors for the detection of flight states or travel intervals of the vehicle 52. In this manner, the on-board node 56 may detect certain travel intervals during which the on-board data storage entity 68 is powered by a power source that is known to be "stable," or relatively reliable compared to other power sources available during other travel intervals. The on-board node 56 may utilize such detections to time (e.g., delay) recoveries of the on-board data storage entity 68 during these travel intervals (e.g., via the delayed data recovery module 70). For example, in the case in which the vehicle 52 is an aircraft, the on-board node 56 may execute a process to determine travel intervals such as: (i) a "weight on wheels" state (e.g., when an aircraft is on the ground but has departed a gate or port); (ii) a "below service altitude" state when an aircraft is below a threshold altitude (e.g., 10,000 feet); (iii) an "above service altitude" state when an aircraft is above the threshold altitude; (iv) a "descending" state when the an aircraft is descending to a destination port; (v) a "parked"

state when the aircraft is parked at a gate or port; or other suitable transportation or travel states corresponding to the vehicle 102.

Communication System Overview

Figure 2:
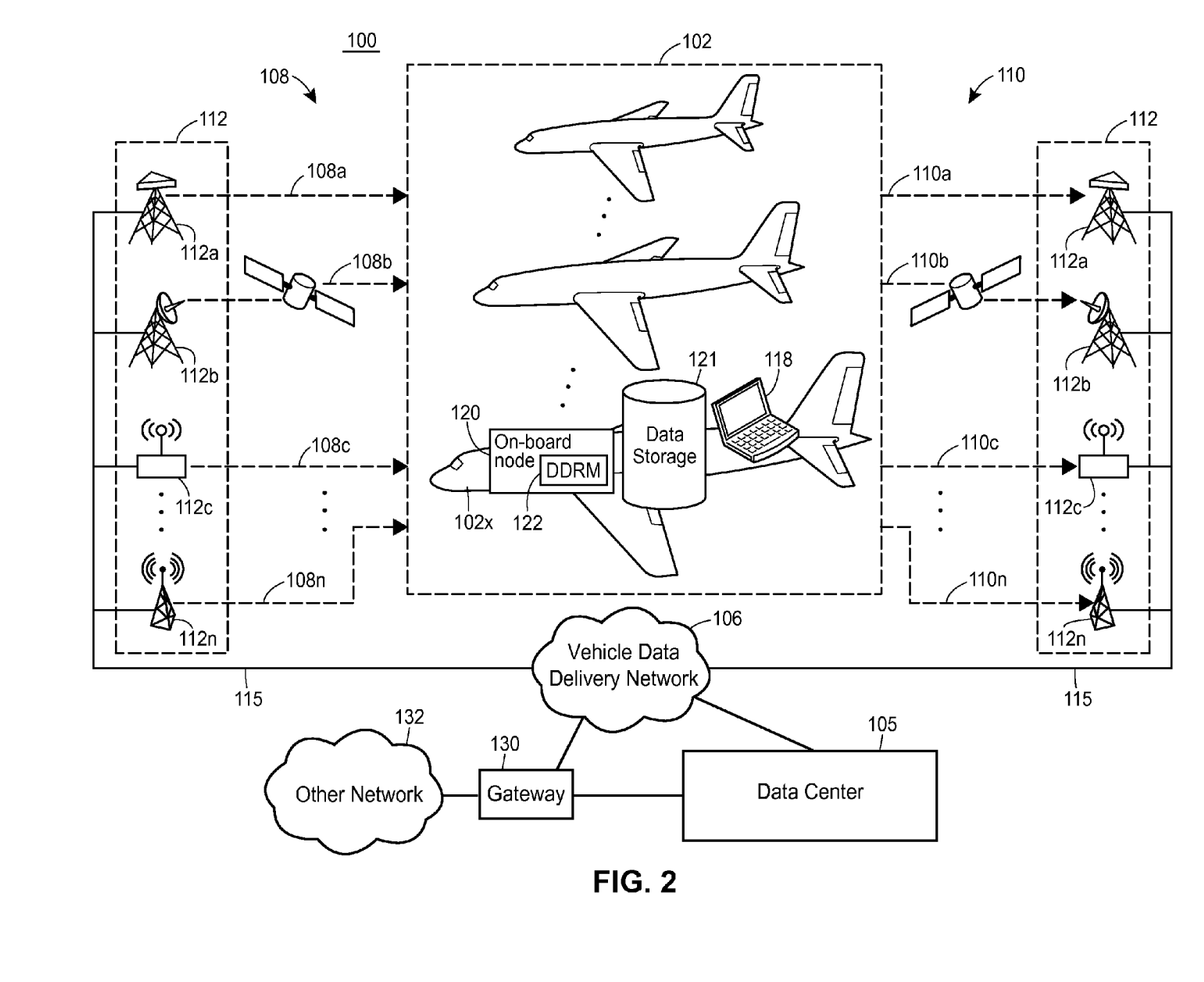
FIG. 2 illustrates an exemplary communications system for delivering data to and from devices that are on-board a set of vehicles, such as the vehicle illustrated in FIG. 1.
Figure 3:
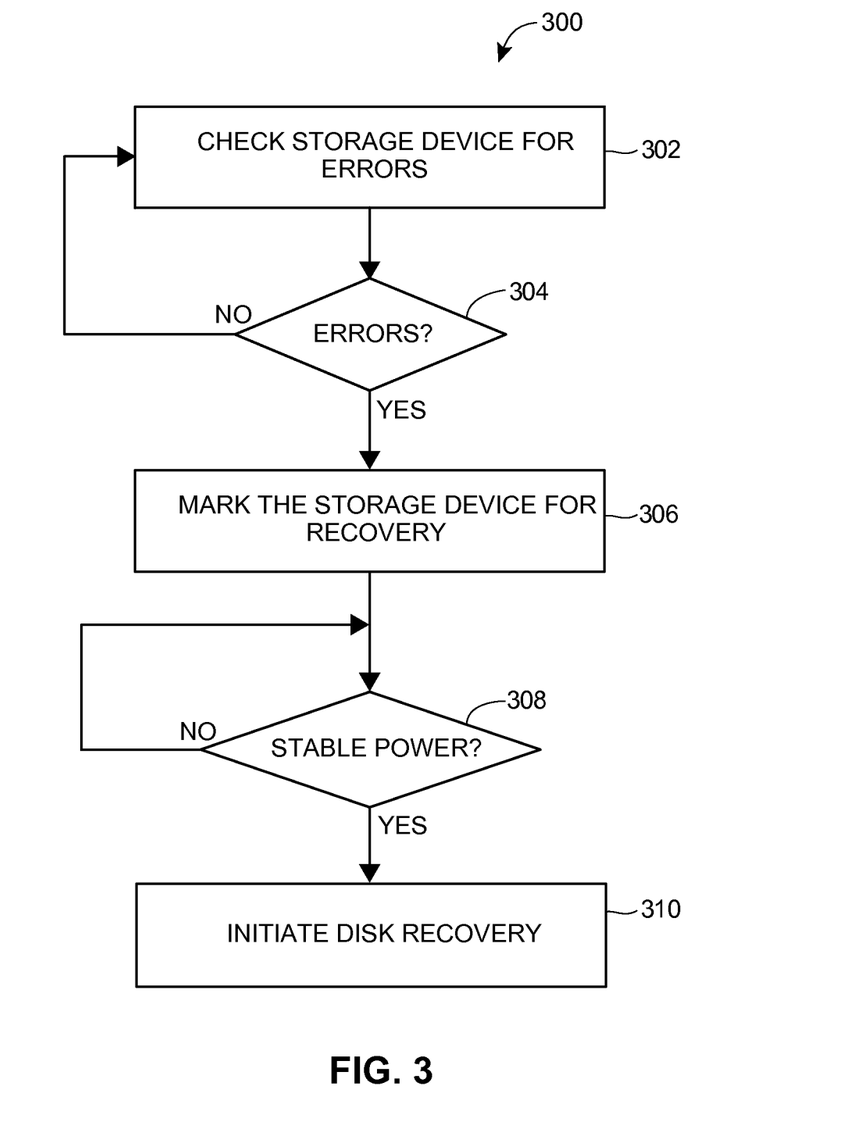
FIG. 3 is a flow diagram of an example method for delaying, or otherwise timing, recoveries of disks which can be implemented in the system illustrated in FIG. 1.
Figure 4:
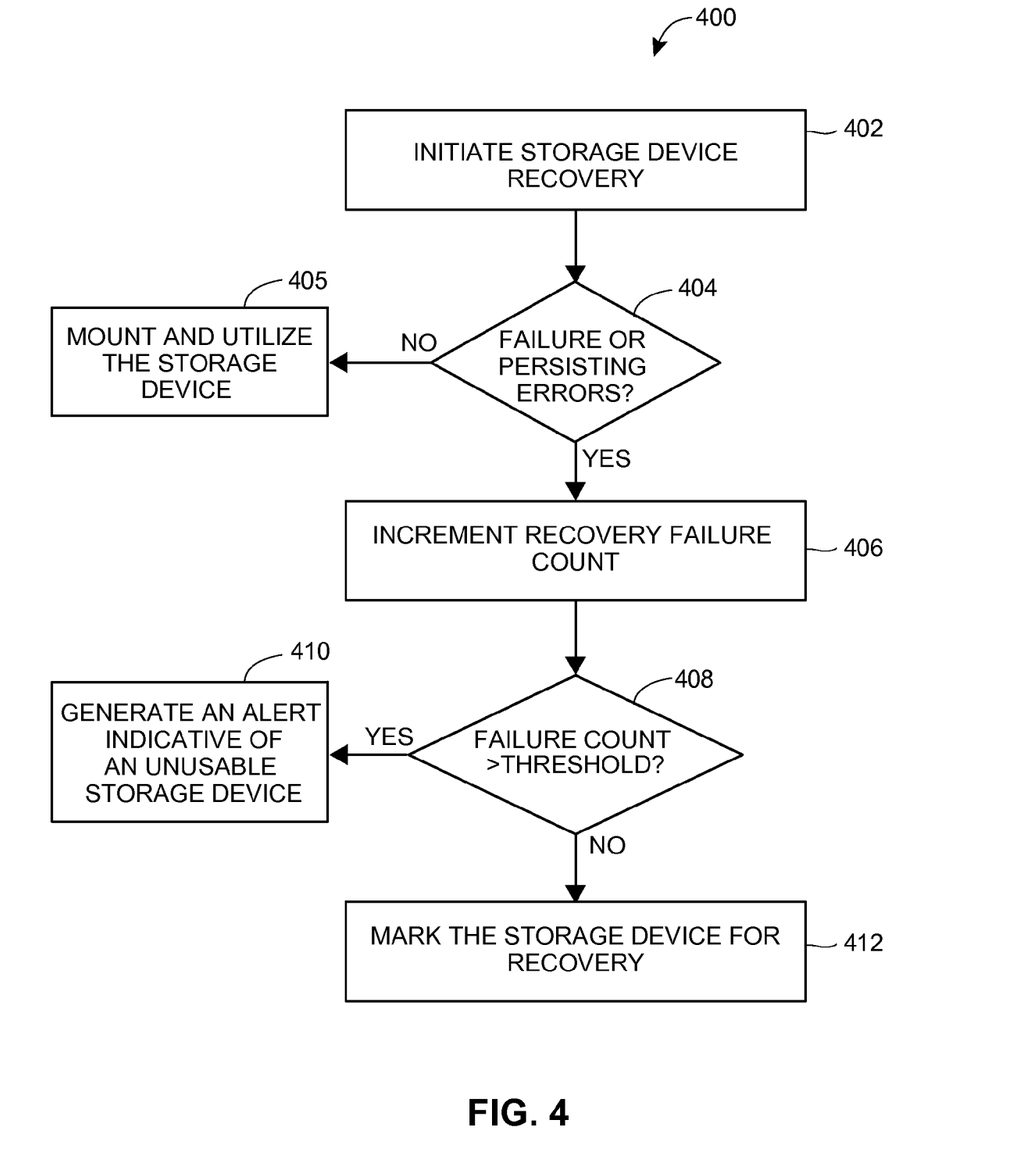
FIG. 4 is a flow diagram of an example method for managing the recovery of disks which can be implemented in the system illustrated in FIG. 1.

FIG. 2 is a block diagram depicting an example communications system 100 in which the vehicle 52 (illustrated in FIG. 1) may operate and implement the disk recovery methods discussed further with reference to FIGS. 3 and 4.

The system 100 is configured to deliver data, information, or content to a specific device on-board one of a plurality of vehicles 102 (e.g., a device 118, such as one of the device 54, on-board the vehicle 102x) from a data center 105, which data, information, or content may be stored or utilized on-board the vehicles 102. In some implementations, the communications system 100 is also configured to deliver feedback information from the vehicle 102x to the data center 105, and the data center 105 may use the feedback information to generate records of data usage, track availability and health of storage devices, inform subsequent data delivery to the on-board device 118 or to other on-board devices, etc. In an embodiment, the data center 105 is communicatively connected to the vehicles 102 via one or more vehicle data delivery networks 106, one or more forward links 108, and one or more reverse links 110.

One or more of the vehicles 102 may be owned and/or operated by a specific individual. In some cases, one or more of the vehicles 102 may be owned and/or operated by a company, organization or government entity. For example, the vehicles 102 may include a fleet of vehicles that are used to transport passengers who pay for or otherwise are granted passage on one of the vehicles of the fleet. The vehicles 102 may include one or more vehicles that are used by an organization to transport employees and their guests, in some situations. One or more of the vehicles 102 may be used to transport live or inanimate cargo, packages, mail, and/or other types of cargo. It is noted that although FIG. 1 depicts the vehicles 102 as being airplanes, the techniques and principles described herein equally apply to other types of vehicles such as trucks, automobiles, busses, trains, boats, ships, barges, subway cars, helicopters or other types of aircraft, ambulances or other emergency vehicles, military vehicles, other air-borne, water-borne, or land-borne vehicles, and vehicles that are suitable for space travel.

Each of the vehicles 102 may be communicatively connected to the data center 105 via one or more forward wireless communication links 108 and one or more reverse wireless communication links 110. The links 108, 110 may be collectively supported by a multiplicity of radio frequency (RF) bands. Typically, a particular frequency band or portion of RF spectrum supporting the links 108, 110 is allocated (e.g., by a governmental or regulatory body) for a particular type of wireless communications such as satellite communications, communications, terrestrial cellular communications, near-field wireless communications, ham-radio, and the like. In some allocated frequency bands, the wireless communications may be transmitted over a forward link and a corresponding reverse link using a respective wireless communication protocol that is defined, designated or otherwise indicated by a standards association and/or by a government or other regulatory body. A particular frequency band may support a point-to-point wireless protocol and/or may support a broadband wireless protocol, for example.

Each frequency band may include one or more channels. The channels may be formed, defined or allocated by frequency division, time division, code division, some other suitable channel division, or some combination of divisions. Signals that are carried on a channel may or may not be multiplexed. Any one or more channels included in a frequency band may support (or may be designated to support) a forward link and/or a reverse link for wireless communications. Additionally, any one or more of the channels included in a frequency band may be used to deliver signaling, data payload, or a combination of signaling and data payload. For example, a particular frequency band may support an in-band protocol in which signaling and payload are transmitted over a same channel within the band, and/or the particular frequency band may support an out-of-band protocol in which the signaling and payload are respectively transmitted over different channels within the band.

A transceiver or modem, such as one of the modems 60, that is fixedly connected to a vehicle 102x may be tuned to a particular frequency band, and thus, along with a respective antenna, may serve as one end of a communication link over which data may be received onto and/or sent from the vehicle 102x. Similarly, a transceiver or modem that is fixedly connected to a structure 112 external to the vehicle 102x may also be tuned to the particular frequency band, and thus, along with a respective antenna, may serve as the other end of the communication link over which the data is received onto and/or sent from the vehicle 102x. The structure 112 that supports the non-vehicle end of the communication link may be, for example, an entirely stationary terrestrial structure such as a building or tower on the ground, a relatively stationary terrestrial structure such as a barge in an ocean, or a non-terrestrial structure such as a satellite or other structure in space. In FIG. 1, the representations of the structures 112 are duplicated to more clearly illustrate the forward links 108 and reverse links 110, however, in practice, each structure 112 may be a unitary structure having a single physical transceiver or modem mounted thereon that services both the respective forward link 108 and the respective reverse link 110. For example, a teleport 112b may include a transceiver that services both the satellite forward link 108b and the satellite reverse link 110b of a particular frequency band allocated for satellite communications. In some instances, a single structure 112 may include multiple transceivers or modems, each of which may be tuned to a different frequency band.

With further regard to the structures 112, in addition to having a transceiver or modem supporting one end of a particular communication link 108, 110 to the vehicle 102x, each structure 112 may include another interface via which a communication path 115 to the data center 105 may be communicatively connected. The interface to the communication path 115 may be a wired or a wireless communications interface.

Data delivered to the device 118 via the communication system 100 may include any type of data. For example, the data may include user-consumable content data such as a text message, a web page, a media file, streaming data, and/or a response to a previous request received at a user interface of the device 118. In some cases, the data that is to be delivered to the device 118 includes data that is to be presented at a user interface of the device 118. In some scenarios, the data that is to be delivered to the device 118 may be an application, a configuration, an update, or software that the user of the device 118 has requested to be downloaded.

In general, the data center 105 may utilize any suitable combination of selected forward links 108, reverse links 110, messaging protocols, and/or delivery schemes to transmit data to and receive feedback information from the vehicles 102. Further details of the data center 105 are discussed in more detail in later sections of this disclosure.

Turning now to the vehicles 102, some or all of the vehicles 102 (e.g., the vehicle 102x) may each include a respective on-board node 120 to manage and store data that is received onto the vehicle 102x and that is intended for delivery to a particular on-board device 118. The on-board node 120 may also manage data that is generated by the on-board devices 118 and that is to be transmitted from the vehicle 102x, in an implementation. Further, within the vehicle 102x itself, the on-board node 120 may manage communications of said data to and from a data storage entity 121 and the on-board devices 118, e.g., by using one or more communication networks that are contained within the vehicle 102x as further illustrated in FIG. 1. In an embodiment, the on-board node 120 is included in an on-board data distribution system or device such as the data distribution device described in aforementioned co-pending U.S. patent application Ser. No. 13/675,200 entitled "VEHICLE DATA DISTRIBUTION SYSTEM AND METHOD."

In some cases, the on-board node 120 may include a delayed data recovery module 122 (or "DDRM") to recover data from the data storage entity 121, as further discussed with reference to FIG. 1. In an embodiment, the delayed data recovery module 122 may also cause log files, error files, journal files, or other records of data recovery and errors in the data storage entity 121 to be communicated to the data center 105. In this manner, the data center 105 may maintain a record of the health of data storage entities (such as the data storage entity 121) on the vehicles 102, errors on data storage entities on the vehicles 102, the availability of certain portions of data stored on data storage entities on the vehicles 102, etc.

In an embodiment, at least a portion of the vehicle data delivery network 106 may be disposed in a terrestrial location, e.g., a packet network router, an optical switch, etc. may be located within a climate-controlled structure on the ground. In an embodiment, at least a portion of the vehicle data delivery network 106 may be disposed in a non-terrestrial location, e.g., a routing node may be disposed on a satellite or aircraft. The vehicle data delivery network 106 may include a public network, a private network, or some combination of one or more public networks and one or more private networks. The vehicle data delivery network 106 may include a communications network, a data network, a packet network, or some combination thereof. The vehicle data delivery network 106 may include a hosted network, or may be a peer-to-peer or other type of ad-hoc network. Indeed, the vehicle data delivery network 106 may use any known networking technology or combination(s) thereof for delivering data. For example, the vehicle data delivery network 106 may use any known networking technology or combination(s) thereof for delivering data between the one or more structures 112 and the data center 105 or the hybrid communications distributor 104 at the data center 105. Generally, the vehicle data delivery network 106 may include a plurality of computing devices that are communicatively connected. One or more portions of the vehicle data delivery network 106 may be included in the ground based system described in the aforementioned co-pending U.S. patent application Ser. No. 13/675,190 entitled "GROUND SYSTEM FOR VEHICLE DATA DISTRIBUTION," in an embodiment.

The data center 105 may be communicatively connected to the vehicle data delivery network 106, and may include one or more computing devices in communicative connection so that they collectively appear, to other networks and/or computing devices, as a single logical entity. In an embodiment, the data center 105 includes the hybrid communications distributor 104. The data center 105 may be located at least partially in a terrestrial environment, e.g., in one or more stationary buildings or structures. For example, one or more portions of the data center 105 may be included in a ground distribution network, such as the ground distribution network described in aforementioned co-pending U.S. patent application Ser. No. 13/675,190. In an embodiment, at least a portion of the data center 105 may be located in a non-terrestrial environment, e.g., on an aircraft, satellite, or space station. It is clear, however, that the data center 105 may be located in any suitable environment, whether stationary, mobile, in a vehicle, terrestrial, or non-terrestrial. In an embodiment, multiple data centers 105 may be included in the communications system 100 for servicing different types of data, different customers, different geographical areas, or any other desired or suitable differentiations.

The data center 105 may also be communicatively connected via one or more gateways 130 to one or more other networks 132. Generally, a gateway 130 may include one or more computing devices in communicative connection, and may serve as a boundary between the communications system 100 and one or more other networks 132. In some embodiments, at least some of the computing devices included in the gateway 130 may also be included in the data center 105. The one or more other networks 132 in communicative connection with the gateway 130 may include, for example, the Internet, a PSTN (Public Switched Telephone Network), and/or some other public network. Additionally or alternatively, the one or more other networks 132 may include one or more private networks. The one or more networks 132 may include any number of wired and/or wireless networks. Although FIG. 1 illustrates the data center 105 being connected to one other network 132 via one gateway 130, the techniques and principles described herein equally apply to hybrid communications systems 100 having and/or being in communicative connection with any desired number of other networks 132 via any number of gateways 130. In some embodiments of the system 100, the gateway 130 may be omitted.

In an embodiment, the other network 132 may provide data, e.g., via the gateway 130 or via a direct connection, that is to be delivered to a particular device 118 that is on-board a vehicle 102x or stored on the data storage entity 121. In an example, the other network 132 is communicatively connected, via a gateway 130, to one or more computing devices, such as the web server 109, that host a website which a user of the device 118 requests access, and information associated with the website (e.g., the web page, objects, and links thereon) is to be delivered to the device 118 for presentation on a user interface of the device 118 in response to the user request. In yet another example, the other network 132 is communicatively connected to a streaming media provider, and a streamed video file is the data to be delivered to the on-board device 118 for consumption by the device's user at a user interface. Of course, any type of data may be provided to the data center 105 by any other network 132 or content provider (via the gateway 130, if necessary) for delivery to an indicated device 118 on-board the vehicle 102x or for storage on the data storage entity 121, e.g., text messages, web pages, media content, streaming data, a response to a previous request received at a user interface of the device 118, data that is to be presented at a user interface of the device 118, an application, a configuration, or other software that the user of the device 118 has requested to be downloaded from the other network 132. Additionally, return data or information from the on-board device 118 (e.g., an activation of a user control, a return text message, a request or command, etc.) that is received at the data center 105 may be delivered (via the gateway 130, if necessary) to the other network 132.

Delayed Disk Recovery

FIG. 3 is a flow diagram of an example method 300 for recovering data stored on a data storage device during a travel interval in which the data storage device is powered by a stable power source. The method 300 may be implemented by the on-board node 56 or the on-board node 120, for example.

To begin, a data storage device being transported by a vehicle, such as the data storage entity 68, is checked for errors (block 302). The checking for errors on a data storage device may include determining if one or more hard drives or solid state drives are partitioned or can be mounted (i.e., such that a computer device, such as the on-board node 46 can use or access the drives), in an implementation. For example, upon an initialization or "boot-up" of the on-board node 56, the on-board node 56 may execute one or more scripts or processes to determine if the data storage entity 68 is partitioned and/or can be mounted. If the data storage entity cannot be mounted, the on-board node 56 may determine that the data storage entity 68 includes an error. Generally, an on-board node or other computing device may detect any number and type of errors on a data storage device such as failure to mount a drive, a lack of partitioning, one or more bad sectors on a drive, a head crash, etc. Further, in some cases, the on-board node 56 may delay the recovery of a disk exhibiting certain types of errors and/or verify certain errors at later time to prevent recoveries of disks having mistakenly identified errors, as further discussed with reference to FIG. 3. For example, the on-board node 56 may implement logic to detect when the data storage entity 68 is unavailable or unmountable due to low/high temperatures. When such unavailability is detected, the on-board node 56 may not initiate data recovery of the data storage entity 68 or may, in some cases, verify the health of the on-board node 56 at another time.

If it is determined that the storage device includes one or more errors (block 304), the storage device is "marked" for recovery (block 306). Otherwise, an on-board node may continue to (e.g., periodically or upon another boot-up) check the storage device for errors. In an implementation, the delayed data recovery module 70 may "mark" a storage device for recovery by generating or modifying an error log file or other suitable computer-readable file indicating the current health of the storage device. For example, upon detecting an error on the data storage entity 68, the delayed data recovery module 70 may modify an entry in a bitmask file such that the entry indicates an error on the data storage entity 68. In some implementations, such a bitmask, or other error log, file may include a binary indication of whether or not a storage device includes an error (e.g., yes/no), and, in other cases, the delayed data recovery module 70 may generate a file indicating particular types of errors, such as a failure to mount a storage device.

It is then determined if the marked storage device has current access to stable power or is currently powered by a stable power source (block 308). That is, it may be determined if a vehicle, in which the storage device is disposed, is providing power to the storage device via a stable, reliable, or predictable power source. The on-board node 56 may execute one or more processes to determine a current travel interval or flight state, such as "weight on wheels" or "below service altitude." The delayed data recovery module 70 may then determine if, based on programmed or otherwise pre-defined rules, the current travel interval corresponds to a travel interval during which stable power is available. For example, the delayed data recovery module 70 may associate "weight on wheels," "parked," and "below service altitude" travel intervals with a high probability of unstable or unreliable power (e.g., due to a switching between power sources) and an "above service altitude" travel interval with stable power. However, such rules or associations may be programmed into the delayed data recovery module 70 based on any suitable properties or operating characteristics of various power sources (e.g., the on-board power sources 72 and the external power input 74) that are utilized during various travel intervals.

In one scenario, the delayed data recovery module 70 may only initiate recoveries during a particular travel interval because, during the particular travel interval, the data storage entity 68 is powered by the main power unit 76, where the main power unit 76 is relatively stable compared to the auxiliary power unit 78 and the external power input 74. For example, the main power unit 76 may statistically (e.g., based on service records or logs) have a higher "up-time" or time without power loss as compared to the auxiliary power unit 78 and the external power input 74. However, in another scenario, the auxiliary power unit 78 may be relatively stable compared to the main power unit 76 and the external power input 74. In such as case, the delayed data recovery module 70 may only initiate recoveries during a particular travel interval during which the data storage entity 68 is powered by the auxiliary power unit 78. Generally, the delayed data recovery module 70 may be programmed to initiate recoveries of data storage entities during any suitable time intervals selected based on a stability of power to the storage entities during those time intervals. Further, in some implementations, the delayed data recovery module 70 may initiate recoveries during multiple time intervals having comparable or suitable stabilities of power. For example, the delayed data recovery module 70 may initiate recoveries of a data storage device during a "parked" travel interval and an "above service altitude" travel interval if, during both travel intervals, the data storage entity 68 is powered by a suitably stable power source.

If it is determined that stable power is available, a recovery of the data storage device may be initiated (block 310). Otherwise, the delayed data recovery module 70 may delay recovery of the data storage device until stable power, or a travel interval corresponding to stable power, is detected. That is, the delayed data recovery module 70 may near continuously, periodically, or otherwise attempt to detect a travel interval corresponding to stable power until such a travel interval is detected. When detected, the delayed data recovery module 70 may initiate a recovery of the data storage device.

Recovery of the data storage device may include the execution (e.g., by one or more processors of the on-board node 56) of one or more scripts or programs configured to repair a damaged partition table or filesystem, create images of data despite filesystem damage or intermittent errors, recover overwritten data, or perform any other functions to recover and/or repair the data storage device, as known in the industry. In some implementations, the delayed data recovery module 70 may only run a recovery process on certain ones of a plurality of storage devices (e.g., a plurality of hard disk drives) based on an indication (e.g., in an error log file) that the certain ones of the plurality of storage devices include errors. Further, the delayed data recovery module 70 may execute specially configured recovery processes for certain of a plurality of storage devices or for certain types of errors based on an error log file. For example, if an error file indicates that a solid state drive includes errors, the delayed data recovery module 70 may execute a certain recovery process different from a recovery process for a hard disk drive, or, if an error file indicates that a partition table of a drive is corrupted, the delayed data recovery module 70 may initiate a recovery process specifically designed to repair partition tables.

In some implementations, the delayed data recovery module 70 may, before initiating a recovery of data, verify errors indicated in an error log or bitmask file, such as the bitmask file described further above. In this manner, the delayed data recovery module 70 may avoid executing recoveries of the data storage device when errors were mistakenly identified (e.g., due to slow boot times or temperature changes).

FIG. 4 is a flow diagram of an example method 400 for managing recoveries of a data storage device. The method 400 may be implemented by the on-board node 56, for example.

First, a recovery of a data storage device may be initiated (block 402). For example, the delayed data recovery module 70 may initiate a recovery of the data storage entity 68 according to the example method 300, as discussed with reference to FIG. 3. After the recovery is completed or terminates, it is determined if: (i) the recovery process failed, or did not fully complete the recovery process; or (ii) the storage device still includes one or more errors (block 404). For example, a recovery process may terminate early (e.g., before completing) and output an error or log file indicative of the early termination. The delayed data recovery module 70 may analyze such a file to determine that the recovery process failed. In some implementations, the delayed data recovery module 70 may perform a check for errors similar to the check performed in block 302 of the example method 300 to determine if the errors identified on the storage device were repaired by the recovery process or if some errors still exist.

If the recovery completed successfully and no errors are detected, the flow may continue to block 405 where the storage device may be mounted and utilized. For example, the on-board node 56 may mount the data storage entity 68 and utilize the data storage entity 68 to distribute multimedia content to passengers on the vehicle 52.

However, if the recovery process failed or if errors are still detected on the storage device, the flow continues to block 406 where a recovery failure count is incremented. The delayed data recovery module 70 may maintain a variable, log, or other file with a number of failed recoveries of the storage device, and the data recovery module 70 may update the number of failed recoveries to reflect the detected failure at block 404. In some implementations, the failure count may include only indications of recovery failures detected since the last time at which the storage device was "healthy" or in normal operation, and/or the failure count may include indications of all detected recovery failures of the storage device over the operating lifetime of the storage device or another suitable time period.

If the failure count is greater than a threshold value (block 408), after being incremented, an alert may be generated that is indicative of the storage device being unusable or unable to be recovered. In an implementation, the alert may be an indication to one or more applications, processes, etc. of the on-board node 56 that the storage device is unable to be mounted or accessed. Also, the delayed data recovery module 70 may generate one or more communications (e.g., messages, such as HTTP messages) indicative of the unusable data storage entity 68 to be communicated to data centers, or other remote computer devices, external to the vehicle 52, such as the data center 105. In this manner, the delayed data recovery module 70 may inform operators of passenger services (e.g., on-board WiFi or multimedia services) or operators of the vehicle 52 itself of the unavailability of the data storage entity 68. In some implementations, the data center 105 or other suitable terrestrial computing devices may maintain records (e.g., in a database of the data center 105) of the availability of data storage entities on the vehicle 102 based on such communications.

In some implementations, an on-board node may, in addition to determining if a failure count is above a threshold, determine if particular types of errors are present on a data storage entity. If certain "unrecoverable" errors are detected, an alert may be generated that is indicative of the storage device being unusable or unable to be recovered. For example, an on-board node may utilize a SMART (Self-Monitoring and Reporting Technology) metric to check for errors indicative of an unrecoverable data storage entity.

If the failure count is not greater than the threshold, the data storage device may be marked for another attempted recovery (block 412). The storage device may be marked for a subsequent recovery as discussed further with reference to FIG. 3, and the delayed data recovery module 70 may initiate the recovery according to the determinations discussed with referenced to FIG. 3.

In any event, the delayed data recovery module 70 may generate and or maintain one or more files (e.g., stored in the on-board node 56) indicative of the health of the data storage entity 68. For example, the delayed data recovery module 70 or other suitable process executed by the on-board node 56 may maintain a file indicating times at which certain storage devices, such as the on-board data storage entity 68, were available (e.g., mounted or otherwise accessible). The on-board node 56 may communicate some or all of this file to the data center 105 (e.g., via a reverse link) allowing the data center 105 to maintain records of the health and availability of data storage entities on-board vehicles, such as the vehicles 102.

Optimizing the Writing of Data

In some implementations, the on-board data storage entity 68 may store indices or other reference data not intended to be distributed to passengers on the vehicle 52 (in addition to various types of data distributed to and/or received from the devices 54). For example, the on-board data storage entity 68 may store a table of indices which point to portions of data stored elsewhere on the on-board data storage entity 68, such as particular movies, particular songs, particular cached web pages, etc. Also the on-board data storage entity 68 may store reference data such as data indicating when certain portions of data (e.g., particular movies) were distributed to one or more of the devices 54 or how long a particular one of the devices 54 was accessing certain data stored on the on-board data storage entity 68.

To store such index or reference data, the on-board node 56 or other device needs to "write" the information to the on-board data storage entity 68. However, as discussed above, a power loss during such writing of information may corrupt or damage the on-board data storage entity 68. In some scenarios, such indices or reference data, or at least some indices and reference data, are unnecessary in that it is they are not utilized or accessed by either an operator of services (e.g., multimedia services) or passengers/devices on the vehicle 52. As such, the on-board node 56 may control writes of index or reference information so as to eliminate any unnecessary writes. In this manner, the on-board node 56 may further minimize the chances of damage to a storage device upon a loss of power.

Computing Devices in the on-Board/Communications System

Figure 5:
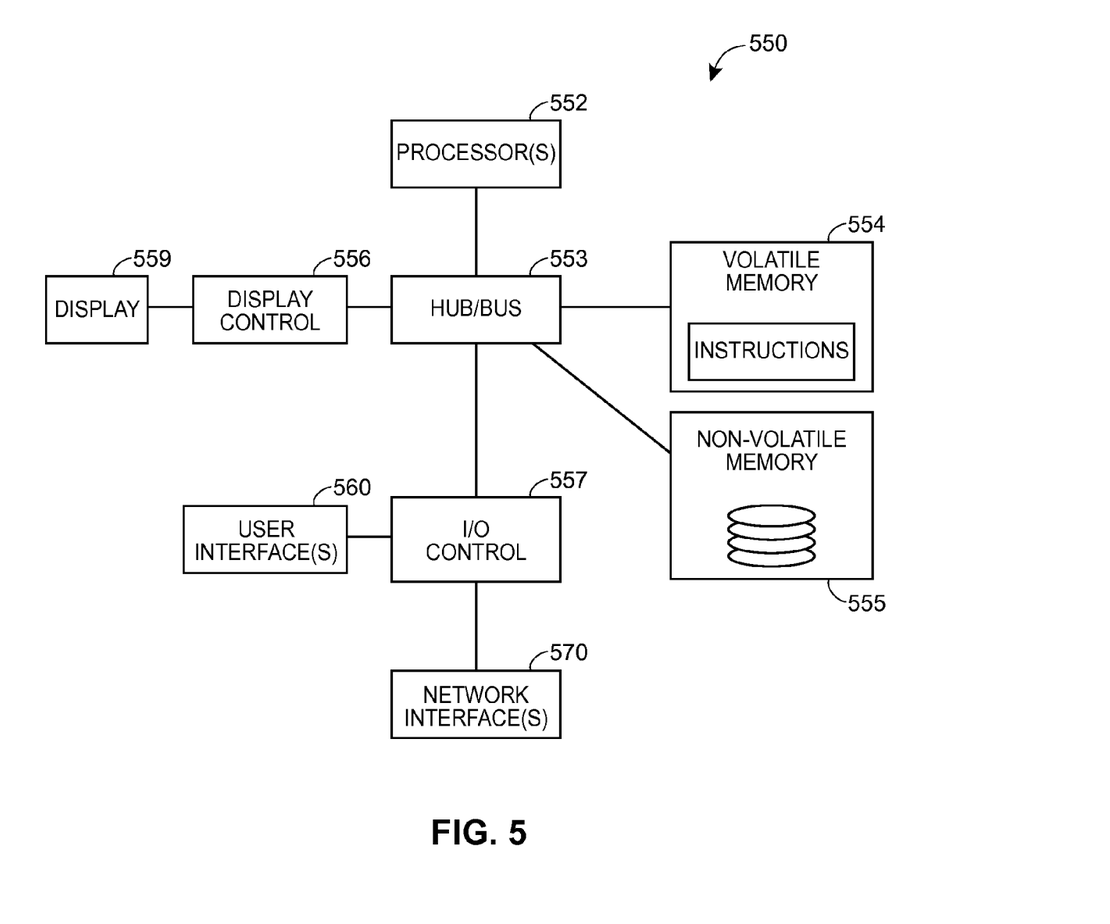
FIG. 5 is a block diagram of an example computing device that may be utilized in a system on-board a vehicle or a communications system, such as the systems illustrated in FIGS. 1 and 2.

FIG. 5 illustrates a block diagram of an example computing device 550 that may be utilized in the onboard system 50 or the communications system 100. For example, one or more computing devices 550 may be particularly configured to be utilized as at least a portion of the data center 105, the vehicle data delivery network 106, the on-board node 120, or the device 118. Additionally, other devices illustrated in FIGS. 1 and 2 such as the cockpit electronics node 62 may include an embodiment of the computing device 550.

The computing device 550 may include, for example, one more central processing units (CPUs) or processors 552, and one or more busses or hubs 553 that connect the processor(s) 552 to other elements of the computing device 550, such as a volatile memory 554, a non-volatile memory 555, a display controller 556, and an I/O controller 557. The volatile memory 554 and the non-volatile memory 555 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 554 and/or the memory 555 may store instructions 558 that are executable by the processor 552. For example, in a computing device particularly configured to be included in the data center 105, the instructions 558 may be the instructions comprising the hybrid communications distributor 104. In another example, in a computing device 550 particularly configured to be the on-board node 56, the instructions 558 may be the instructions comprising the delayed data recovery module 70. In yet another example, in a computing device 550 particularly configured to be a device 118, the instructions 558 may be the Vehicle Travel Application (VTA). Indeed, each of the modules, applications and engines described herein can correspond to a different set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 554, 555 stores a subset of the modules and data structures identified herein. In other embodiments, at least one of the memories 554, 555 stores additional modules and data structures not described herein.

In an embodiment, the display controller 556 may communicate with the processor (s) 552 to cause information to be presented on a connected display device 559. In an embodiment, the I/O controller 557 may communicate with the processor(s) 552 to transfer information and commands to/from the user interface 560, which may include a mouse, a keyboard or key pad, a touch pad, click wheel, lights, a speaker, a microphone, etc. In an embodiment, at least portions of the display device 559 and of the user interface 560 are combined in a single, integral device, e.g., a touch screen. Additionally, data or information may be transferred to and from the computing device 550 via a network interface 570. In some embodiments, the computing device 550 may include more than one network interface 570, such as a wireless interface and a wired interface.

The illustrated computing device 550 is only one example of a computing device suitable to be particularly configured for use in the hybrid communications system 100. Other embodiments of the computing device 550 may be also be for use in the hybrid communications system 100, even if the other embodiments have more or fewer components than shown in FIG. 5, have one or more combined components, or have a different configuration or arrangement of the components. Moreover, the various components shown in FIG. 5 can be implemented in hardware, a processor executing software instructions, or a combination of both hardware and a processor executing software instructions, including one or more signal processing and/or application specific integrated circuits.

Additional Considerations

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A method of recovering content stored on a computer readable medium transported by a vehicle, the method comprising:
identifying, by one or more computer processors, an error on the computer readable medium;
storing, by the one or more computer processors, an indication of the error;
detecting, by the one or more computer processors, an interval of travel of the vehicle during which the computer readable medium has access to stable power; and
during the detected interval of travel, initiating, by the one or more computer processors, a recovery of the computer readable medium based on the indication of the error.

2. The method according to aspect 1, further comprising:
detecting, by the one or more computer processors, a failure of the recovery of the computer readable medium; and
incrementing a failure count based on the detected failure.

3. The method according to either aspect 1 or aspect 2, further comprising:
determining, by the one or more computer processors, that the failure count indicates a number of failures greater than a threshold; and
generating, by the one or more computer processors, an alert indicating that the computer readable medium is unusable.

4. The method according to any one of the preceding aspects, further comprising:
determining, by the one or more computer processors, that the failure count indicates a number of failures less than a threshold; and
during the interval of travel or a subsequently detected interval of travel, initiating, by the one or more computer processors, the recovery of the computer readable medium.

5. The method according to any one of the preceding aspects, wherein the vehicle is an aircraft, and wherein detecting the interval of travel of the vehicle includes detecting a flight state of the aircraft.

6. The method according to any one of the preceding aspects, wherein the flight state is indicative of the aircraft reaching a cruising altitude.

7. The method according to any one of the preceding aspects, wherein identifying the error on the computer readable medium includes:
executing, by the one or more computer processors, a script to mount the computer readable medium for access by a computer device, and
detecting, by the one or more computer processors, a failure of the script to mount the computer readable medium.

8. The method according to any one of the preceding aspects, wherein the computer readable medium includes a plurality of drives transported by the vehicle, the plurality of drives including at least one of disk drives or solid state drives, and wherein executing the script to mount the computer readable medium includes executing the script to mount each of the plurality of disk drives.

9. The method according to any one of the preceding aspects, wherein identifying the error on the computer readable medium includes identifying a health of each of a plurality of drives, and wherein the indication of the error is indicative of the health of each of the plurality of drives.

10. A computer device for recovering a content storage device being transported by a vehicle, the computer device comprising:
one or more processors; and
one or more non-transitory memories coupled to the one or more processors;
wherein the one or more non-transitory memories include computer executable instructions stored therein that, when executed by the one or more processors, cause the computer device to:
execute a script to mount the content storage device for accessing content stored by the content storage device,
detect a failure of the script to mount the content storage device,
store an indication of the failure to mount the content storage device;
detect an interval of travel of the vehicle during which the content storage device is powered by a stable source of power; and
during the detected interval of travel, initiate a recovery of the content storage device based on the indication of the failure to mount the content storage device.

11. The computer device of aspect 10, wherein the content stored by the content storage device includes multimedia content for distribution to passengers on the vehicle.

12. The computer device of either aspect 10 or aspect 11, wherein the content storage device includes a plurality of drives, and wherein the plurality of drives includes at least one of disk drives or solid state drives.

13. The computer device according to any one of aspects 10 to 12, wherein the computer executable instructions further cause the computer device to:
detect a failure of the recovery of the content storage device,
increment a failure count based on the detected failure of the recovery,
determine that the failure count indicates a number of failures greater than a threshold, and
generating an alert indicating that the content storage device is unusable.

14. The computer device according to any one of aspects 10 to 13, wherein the computer executable instructions further cause the computer device to communicate the alert to a remote computer device disposed at a geographic location different from the geographic location of the vehicle.

15. The computer device according to any one of aspects 10 to 14, wherein the vehicle is an aircraft, and wherein communicating the alert to the remote computer device includes communicating the alert from the aircraft to the remote computer device disposed at a terrestrial location while the aircraft is in flight.

16. The computer device according to any one of aspects 10 to 15, wherein the computer executable instructions further cause the computer device to detect a completion of the recovery of the content storage device.

17. The computer device according to any one of aspects 10 to 16, wherein the computer executable instructions further cause the computer device to generate a log indicating times at which the content storage device was unavailable due to at least one of the recovery of the content storage device or the failure to mount the content storage device.

18. The computer device according to any one of aspects 10 to 17, wherein the computer executable instructions further cause the computer device to communicate the log to a remote computer device disposed at a geographic location different from the geographic location of the vehicle.

19. A system disposed in a vehicle for recovering content to be distributed to passengers on-board the vehicle, the system comprising:
a plurality storage devices storing the content to be distributed to passengers on-board the vehicle; one or more processors; and
one or more non-transitory memories with computer executable instructions stored therein that, when executed by the one or more processors, cause the one or more processors to:
identify an error on at least one of the plurality of storage devices,
record an indication of the error,
detect an interval of travel of the vehicle during which the plurality of storage devices are powered by a stable power source, and
during the interval of travel, initiate a recovery of the computer readable medium based on the recorded indication of the error.

20. The system according to aspect 19, wherein detecting the interval of travel during which the plurality of storage devices are powered by the stable power source includes detecting one of a plurality of pre-defined intervals of travel.

What is claimed is:

1. A method of recovering content stored on a computer readable medium transported by a vehicle, the method comprising:
identifying, by one or more computer processors, an error on the computer readable medium;
storing, by the one or more computer processors, an indication of the error;
detecting, by the one or more computer processors, an interval of travel of the vehicle during which the computer readable medium has access to stable power; and
during the detected interval of travel, initiating, by the one or more computer processors, a recovery of the computer readable medium based on the indication of the error.

2. The method of claim 1, further comprising:
detecting, by the one or more computer processors, a failure of the recovery of the computer readable medium; and
incrementing a failure count based on the detected failure.

3. The method of claim 2, further comprising:
determining, by the one or more computer processors, that the failure count indicates a number of failures greater than a threshold; and generating, by the one or more computer processors, an alert indicating that the computer readable medium is unusable.

4. The method of claim 2, further comprising:
determining, by the one or more computer processors, that the failure count indicates a number of failures less than a threshold; and
during the interval of travel or a subsequently detected interval of travel, initiating, by the one or more computer processors, the recovery of the computer readable medium.

5. The method of claim 1, wherein the vehicle is an aircraft, and wherein detecting the interval of travel of the vehicle includes detecting a flight state of the aircraft.

6. The method of claim 5, wherein the flight state is indicative of the aircraft reaching a cruising altitude.

7. The method of claim 1, wherein identifying the error on the computer readable medium includes:
executing, by the one or more computer processors, a script to mount the computer readable medium for access by a computer device, and
detecting, by the one or more computer processors, a failure of the script to mount the computer readable medium.

8. The method of claim 7, wherein the computer readable medium includes a plurality of drives transported by the vehicle, the plurality of drives including at least one of disk drives or solid state drives, and wherein executing the script to mount the computer readable medium includes executing the script to mount each of the plurality of disk drives.

9. The method of claim 1, wherein identifying the error on the computer readable medium includes identifying a health of each of a plurality of drives, and wherein the indication of the error is indicative of the health of each of the plurality of drives.

10. A computer device for recovering a content storage device being transported by a vehicle, the computer device comprising:
one or more processors; and
one or more non-transitory memories coupled to the one or more processors;
wherein the one or more non-transitory memories include computer executable instructions stored therein that, when executed by the one or more processors, cause the computer device to:
execute a script to mount the content storage device for accessing content stored by the content storage device,
detect a failure of the script to mount the content storage device,
store an indication of the failure to mount the content storage device;
detect an interval of travel of the vehicle during which the content storage device is powered by a stable source of power; and
during the detected interval of travel, initiate a recovery of the content storage device based on the indication of the failure to mount the content storage device.

11. The computer device of claim 10, wherein the content stored by the content storage device includes multimedia content for distribution to passengers on the vehicle.

12. The computer device of claim 10, wherein the content storage device includes a plurality of drives, and wherein the plurality of drives includes at least one of disk drives or solid state drives.

13. The computer device of claim 10, wherein the computer executable instructions further cause the computer device to:
detect a failure of the recovery of the content storage device,
increment a failure count based on the detected failure of the recovery,
determine that the failure count indicates a number of failures greater than a threshold, and
generating an alert indicating that the content storage device is unusable.

14. The computer device of claim 13, wherein the computer executable instructions further cause the computer device to communicate the alert to a remote computer device disposed at a geographic location different from the geographic location of the vehicle.

15. The computer device of claim 14, wherein the vehicle is an aircraft, and wherein communicating the alert to the remote computer device includes communicating the alert from the aircraft to the remote computer device disposed at a terrestrial location while the aircraft is in flight.

16. The computer device of claim 10, wherein the computer executable instructions further cause the computer device to detect a completion of the recovery of the content storage device.

17. The computer device of claim 16, wherein the computer executable instructions further cause the computer device to generate a log indicating times at which the content storage device was unavailable due to at least one of the recovery of the content storage device or the failure to mount the content storage device.

18. The computer device of claim 17, wherein the computer executable instructions further cause the computer device to communicate the log to a remote computer device disposed at a geographic location different from the geographic location of the vehicle.

19. A system disposed in a vehicle for recovering content to be distributed to passengers on-board the vehicle, the system comprising:
a plurality storage devices storing the content to be distributed to passengers on-board the vehicle;
one or more processors; and
one or more non-transitory memories with computer executable instructions stored therein that, when executed by the one or more processors, cause the one or more processors to:
identify an error on at least one of the plurality of storage devices,
record an indication of the error,
detect an interval of travel of the vehicle during which the plurality of storage devices are powered by a stable power source, and
during the interval of travel, initiate a recovery of the computer readable medium based on the recorded indication of the error.

20. The system of claim 19, wherein detecting the interval of travel during which the plurality of storage devices are powered by the stable power source includes detecting one of a plurality of pre-defined intervals of travel.

* * * * *